Patented Nov. 20, 1951

2,575,663

UNITED STATES PATENT OFFICE 2,575,663

PROCESS FOR THE TREATMENT OF THE WHITE FRACTION LATEX IN WHICH NON-RUBBER CONSTITUENTS ARE DECOMPOSED

Lili Nelly Sophie Homans, Buitenzorg, near Batavia, Isle of Java, Netherlands East Indies, assignor to Stichting Nederlandsch-Indisch Instituut Voor Rubberonderzoek, Buitenzorg, near Batavia, Isle of Java, Netherlands East Indies No Drawing. Application December 4, 1947, Serial No. 789,770. In the Netherlands December 19, 1946

5 Claims. (Cl. 195—2)

The invention relates to a process in which bacteria and enzymes are made to act on latex and the non-rubber constituents are thereby decomposed and then removed.

In my copending U. S. application, Serial No. 762,805, of which the present application is a continuation-in-part, now abandoned, a process is described in which latex is stirred during a long time under maintentance of a pH value between approximately 6 to 7 and approximately 8 to 9. In this process an action occurs of the bacteria and enzymes present in the latex whereas also a precoagulum of the yellow fraction present in the latex results, which precoagulum is separated from the remaining white latex.

I have discovered that the action of bacteria and enzymes present in the latex is particularly successful when that action is made to take place on the so-called white fraction of latex, i. e. Hevea latex which remains after the yellow fraction is removed therefrom in one way or the other. The white fraction being much more stable than the fresh latex does not coagulate thereby.

The white fraction may be obtained in different manners, e. g. by removal of the liquid yellow fraction by centrifugal action at a suitable pH value, by addition of salts with a monovalent cation or of salts with polyvalent cations, particularly magnesium salts, or by the removal of a solid, yellow precoagulum obtained by the addition of too little acid to coagulate the white fraction, or by introduction of a quantity of alkali, insufficient to stabilize the yellow but sufficient to stabilize the white fraction, or by stirring the latex at a certain pH value as described in the acknowledged copending application.

The best pH value for making bacteria and enzymes act on latex is approximately 6–9. After a removal of the yellow fraction by the addition of acid it is possible that the pH value has too strongly decreased, to below 6, and in that case alkali must be added to bring the latex to the correct pH value.

By the application of the treatment according to the invention a latex is obtained from which rubber with a very low water absorption can be prepared.

By the addition of proteolytic bacteria the process can be promoted. It is also desirable to apply aeration, e. g. by stirring.

The invention is elucidated by some examples from which clearly appears the large decrease of the water absorption by the treatment described.

Example I

From diluted fresh latex the yellow fraction is removed as a precoagulum which has been formed after stirring at a pH value of 7–7.5. The remaining white fraction is stirred further so that the bacteria and enzymes present have the opportunity to decompose the non-rubber constituents present in the white latex. The whole treatment takes about 48 hours.

Thereupon ammonia is added to the white fraction (7.5 g. of $NH_3$ per liter) and this fraction is then creamed with the aid of a De Laval separator. This eliminates the soluble non-rubbers.

The cream obtained is diluted to 5 to 6% DRC and coagulated in the usual manner with diluted formic acid and is worked up to crêpe.

Tested according to the method of Boggs and Blake (Ind. Eng. Chem. 28, 1198, 1936) the crêpe has a water absorption of 73 against an absorption of approximately 200 to 300 with normal crêpe.

Example II

The liquid yellow fraction is removed by centrifugal action from the fresh latex. The volume of white latex is diluted with an equal volume of water and left standing for two days to permit the bacteria and enzymes to act on the non-rubber constituents.

Thereupon creaming takes place after addition of 7.5 g. of $NH_3$ per liter and 14% of a 1%-solution of illis manane meal and 1% of a 5%-soap solution. The creaming is continued for 48 hours.

The obtained cream is worked up to crêpe as in Example I by diluting, coagulating etc.

The obtained crêpe has, according to the method of Boggs and Blake, a water absorption of 74.

Example III

The yellow fraction is removed from the latex by the addition of 1.5% of a 25% NaCl solution at a pH value of 8.1. After standing for approximately 20 hours the yellow fraction has coagulated, and can be removed from the latex. The white fraction obtained stands for another day to give the bacteria the opportunity to further decompose the non-rubber constituents.

Thereupon 7.5 g. of $NH_3$ per liter is added to the white fraction and this is further treated as indicated in Example I.

The water absorption of the crêpe obtained was 69 according to the method of Boggs and Blake.

I claim:

1. In the manufacture of purified rubber having a low water absorption, the process which comprises causing a natural white rubber latex, containing naturally-occurring enzymes and bacteria and from which a yellow rubber fraction has been previously removed, to ferment due to the action of said enzymes and bacteria at fermentation temperatures and under aerobic conditions for a period of from about 1 to 2 days and at a pH value of from about 6 to 9, whereby said enzymes and bacteria decompose and solubilize the proteins present in the latex, creaming the fermented latex by separating serum therefrom, whereby the solubilized proteins are eliminated, and recovering a purified latex from the cream.

2. The process of claim 1 wherein the latex is stirred during the fermentation thereof.

3. The process of claim 1 wherein the latex treated is one which has been fermented previously by the naturally-occurring enzymes and bacteria until a pre-coagulum comprising said yellow fraction is formed, followed by removal of said pre-coagulum.

4. The process of claim 1 wherein the latex treated is one from which the yellow fraction has been removed by centrifugal action.

5. The process of claim 1 wherein the latex treated is one from which the yellow fraction has been removed by addition of sodium chloride to the latex in amount sufficient to produce a pre-coagulum followed by removal of said pre-coagulum.

LILI NELLY SOPHIE HOMANS.

REFERENCES CITED

The following references are of record in the file of this patent:

UNITED STATES PATENTS

| Number | Name | Date |
|---|---|---|
| 1,612,780 | Reel | Dec. 28, 1926 |
| 1,673,672 | Gibbons | June 12, 1928 |
| 1,839,191 | Ambros | Jan. 5, 1932 |
| 2,097,481 | Wallerstein | Nov. 2, 1937 |
| 2,116,089 | Wallerstein | May 3, 1938 |
| 2,126,831 | Spence | Aug. 16, 1938 |